L. B. BOOTH.
OBJECTIVE FOR PHOTOGRAPHIC AND LIKE PURPOSES.
APPLICATION FILED NOV. 9, 1920.
1,421,156.
Patented June 27, 1922.
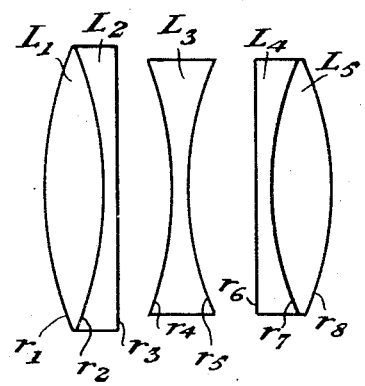
Inventor
Lionel Barton Booth,
by
Attorney.

UNITED STATES PATENT OFFICE.

LIONEL BARTON BOOTH, OF CAMBRIDGE, ENGLAND.

OBJECTIVE FOR PHOTOGRAPHIC AND LIKE PURPOSES.

1,421,156.   Specification of Letters Patent.   Patented June 27, 1922.

Application filed November 9, 1920. Serial No. 422,900.

*To all whom it may concern:*

Be it known that I, LIONEL BARTON BOOTH, a subject of the King of Great Britain, residing in Cambridge, England, have invented certain new and useful Improvements in Objectives for Photographic and like Purposes, of which the following is a specification.

The aim of this invention is to produce an objective corrected for spherical aberration, coma, curvature, astigmatism and chromatic aberrations for a very large aperture.

Many objectives have been made in which a positive lens of glass with high refractive index is followed by an air-space and then by a negative lens with a lower or nearly equal refractive index, following which is an air-space and then a cemented component consisting of a dispersive lens of glass with low refractive index cemented to a collective lens of glass with high refractive index. The front air-space has thus the effect of a dispersive lens and the cemented surface at the back has collective power. By obtaining positive power from the cemented surface, less curvature is required on some of the other surfaces of the system to obtain the same focal length and therefore the tendency is to reduce spherical aberration and to render a large aperture possible; in addition such an arrangement tends to reduce the Petzval sum on which the curvature of field to a large extent depends. In this invention it is proposed to use, instead of the simple lens for the first positive lens, a cemented pair similar to the last component i. e. to make an objective consisting of:—

(1) A front component consisting of a positive lens made of crown glass of high refractive index in the vicinity of 1.6 or 1.61 and having low dispersion, cemented to a negative lens of flint glass of not greater refractive index, the former leading and being bi-convex.

(2) A middle component consisting of a bi-concave negative lens of a flint glass of refractive index less by at least .04 than that of the crown glass used in the positive lenses of the system and having a dispersion at least as great as that of either of the flint glasses used for the other dispersive lenses of the system.

(3) A back component similar in type to the front component but reversed, i. e. with the dispersive lens towards the front, the glasses being similar to but not necessarily identical with those used in the front component.

The curves and separations can be determined by calculation so as to produce an objective remarkably free from the usual aberrations owing to the shallowness of the curves resulting from the considerable contribution to the power of the system by the two cemented surfaces of positive power. A diaphragm may be placed in either of the air-spaces according to convenience.

Full details are now given of an objective constructed on the principles laid down above. The negative lenses are preferably, as indicated, of the same glass. Where the sign preceding a radius is $+$, the surface is convex and where $-$, concave to the incident light, the surfaces being numbered in the order in which they occur, beginning with that on which the light first falls:—

| | | Central thickness. | Diameter. |
|---|---|---|---|
| $L_1$ — 1st lens | $\begin{cases} r_1 = +2.635 \\ r_2 = -2.953 \end{cases}$ | .49 | 2.13 |
| | (cemented) | | |
| $L_2$ — 2nd lens | $\begin{cases} r_2 = -2.953 \\ r_3 = -94.1 \end{cases}$ | .1 | 2.18 |
| | Air separation $= .52$ | | |
| $L_3$ — 3rd lens | $\begin{cases} r_4 = -2.74 \\ r_5 = +2.375 \end{cases}$ | .1 | 1.9 |
| | Air separation $= .53$ | | |
| $L_4$ — 4th lens | $\begin{cases} r_6 = +52.4 \\ r_7 = +2.451 \end{cases}$ | .1 | 1.95 |
| | (cemented) | | |
| $L_5$ — 5th lens | $\begin{cases} r_7 = +2.451 \\ r_8 = -2.451 \end{cases}$ | .49 | 1.95 |

Glasses used:

| | $n_D$ | $n_{G'}$ |
|---|---|---|
| $L_1$ and $L_5$ | 1.6109 | 1.62411 |
| $L_2$ $L_3$ and $L_4$ | 1.5485 | 1.56424 |

$F = 6\frac{1}{4}$    Clear aperture $= 2.08$
Relative aperture $F/3$.

Having thus described the nature of the said invention and the best means I know of carrying the same into practical effect, I claim:—

1. An objective corrected for spherical aberration, coma, astigmatism and curvature, as well as for chromatic aberrations capable of being made with a very large relative aperture made up of (1) a front component consisting of a positive lens made of crown glass of high refractive index in the vicinity of 1.6 or 1.61 and having low dispersion, cemented to a negative lens of flint glass of not greater refractive index, the former leading and being bi-convex; (2) a middle component consisting of a bi-concave negative lens of a flint glass of refractive index less by at least .04 than that of the crown glass used in the positive lenses of the system and having a dispersion at least as great as that of either of the flint glasses used for the other dispersive lenses of the system; (3) a back component, similar in type to the front component but reversed, that is, with the dispersive lens towards the front, the glasses being in type similar to but not necessarily identical with those used in the front component, substantially as described.

2. An objective as claimed in claim 1 wherein the negative lenses in the several components are all of the same glass.

In testimony whereof I have signed my name to this specification.

LIONEL BARTON BOOTH.